April 18, 1967        R. L. BEAM        3,314,170
GEOMETRIC STRUCTURE
Filed Dec. 9, 1964        7 Sheets-Sheet 1
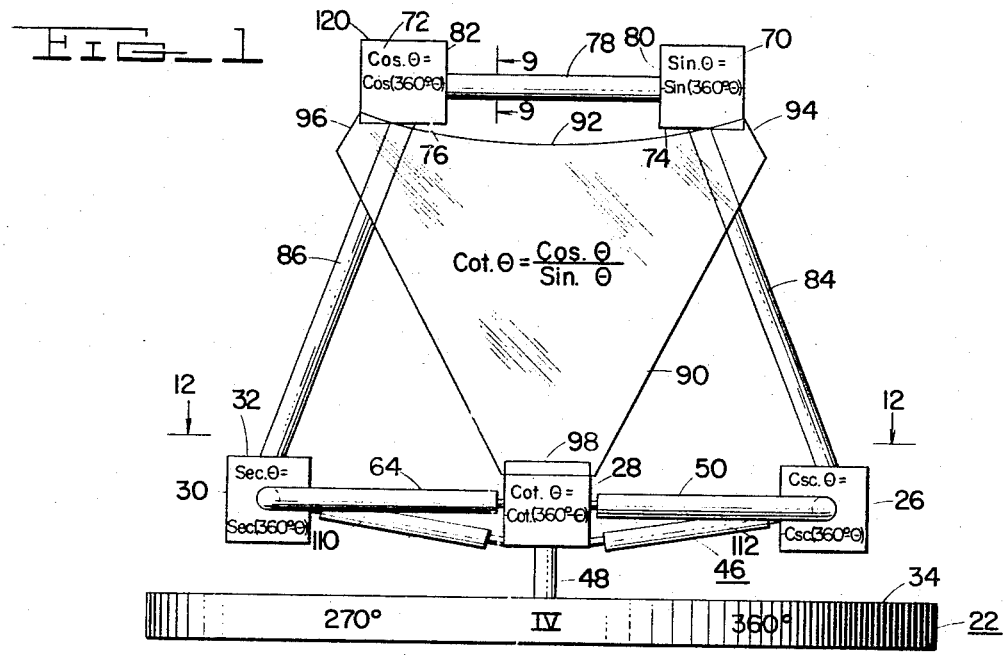
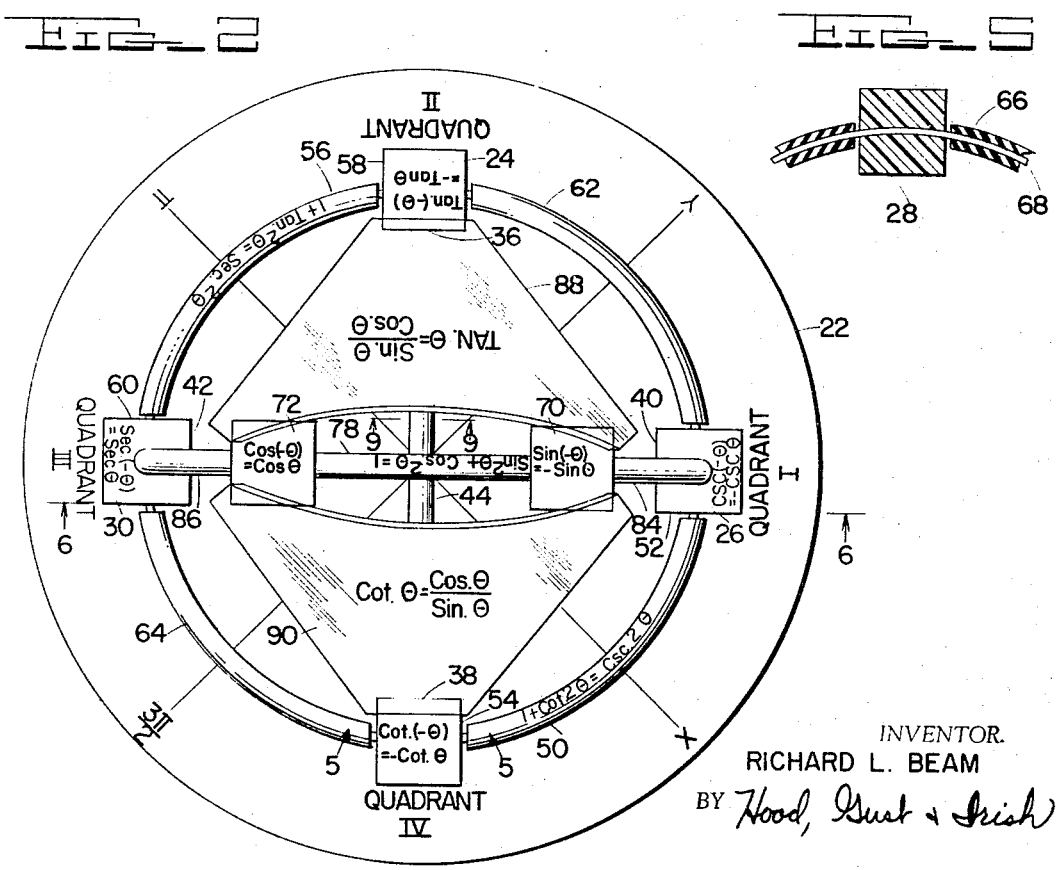
*INVENTOR.*
RICHARD L. BEAM
BY Hood, Gust & Irish
ATTORNEYS April 18, 1967  R. L. BEAM  3,314,170
GEOMETRIC STRUCTURE
Filed Dec. 9, 1964  7 Sheets-Sheet 2
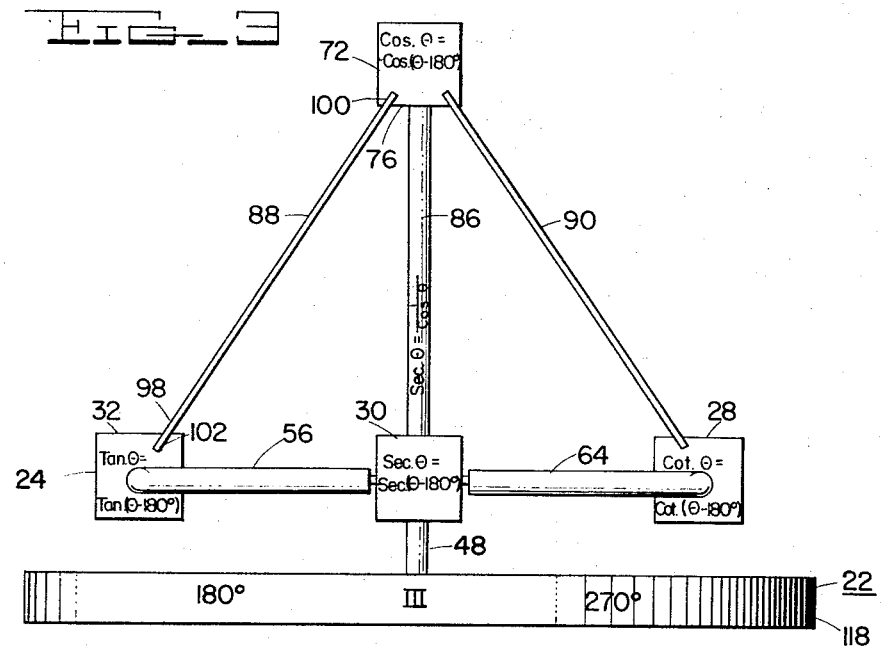
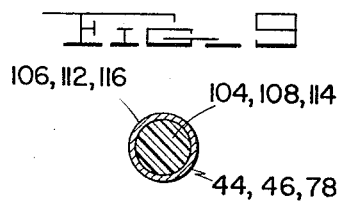
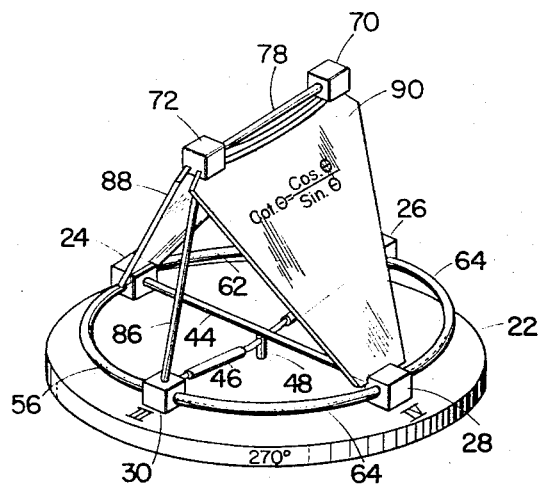
INVENTOR.
RICHARD L. BEAM
BY Hood, Gust & Irish
ATTORNEYS

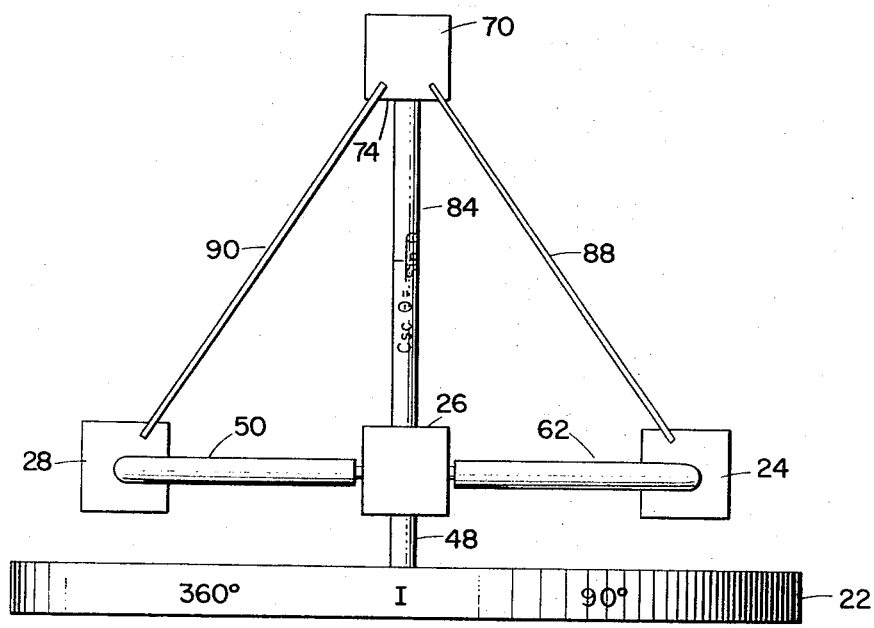

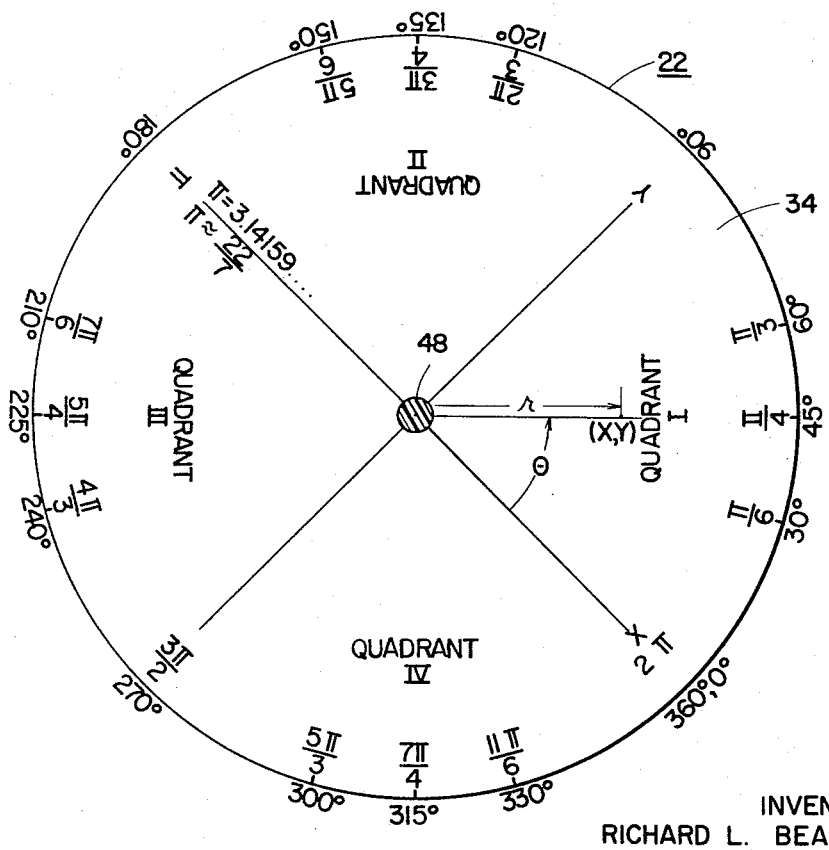

April 18, 1967  R. L. BEAM  3,314,170
GEOMETRIC STRUCTURE
Filed Dec. 9, 1964  7 Sheets-Sheet 5
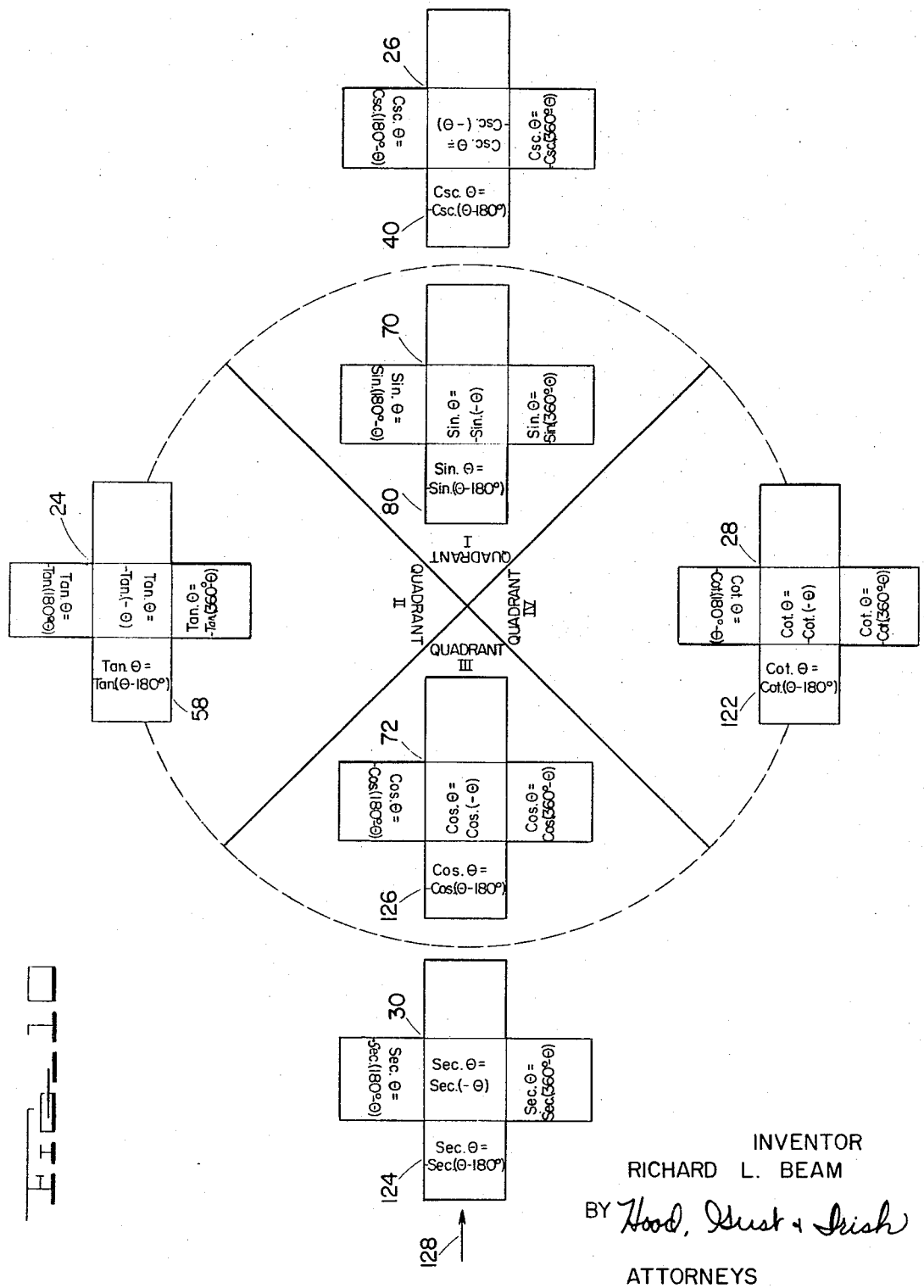
INVENTOR
RICHARD L. BEAM
BY Hood, Gust & Irish
ATTORNEYS April 18, 1967 R. L. BEAM 3,314,170
GEOMETRIC STRUCTURE
Filed Dec. 9, 1964 7 Sheets-Sheet 7
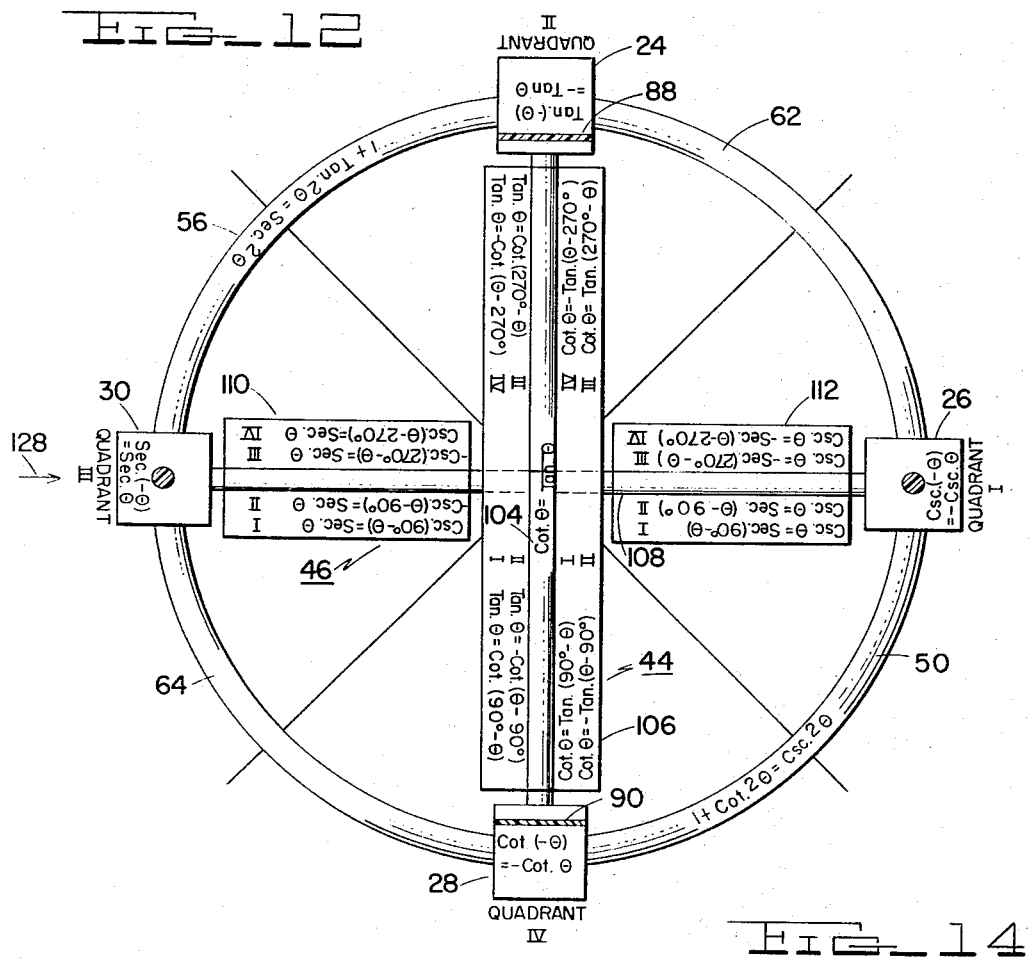
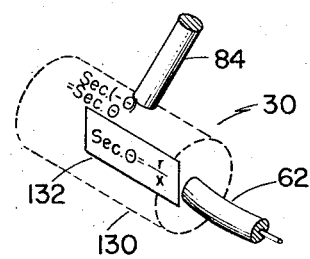
INVENTOR
RICHARD L. BEAM
BY Hood, Gust & Irish
ATTORNEYS

United States Patent Office 3,314,170
Patented Apr. 18, 1967

3,314,170
GEOMETRIC STRUCTURE
Richard L. Beam, Winchester, Va.
(4129 Hoagland Ave., Fort Wayne, Ind. 46807)
Filed Dec. 9, 1964, Ser. No. 417,038
20 Claims. (Cl. 35—34)

This invention relates generally to a geometric structure useful for displaying interrelated mathematical functions and their interrelating equations.

In the teaching and use of mathematics, it is frequently helpful to the student to visualize physical analogies to mathematical functions and their interrelating equations. For example, an equation containing two functions can be visualized as a highway (the equation) connecting two cities (two functions).

It is accordingly an object of this invention to provide a device for visually displaying a plurality of interrelated mathematical functions and their interrelating equations.

Another object of this invention is to provide a teaching aid for visually and three dimensionally displaying trigonometric functions and their interrelating equations.

A further object of this invention is to provide a device for visually and three dimensionally displaying six trigonometric functions, their definitions, the eight basic trigonometric identity equations, the role of the angle and the quadrant relationships thereto, and the co-function and reduction quadrant equations.

Yet another object of this invention is to provide a geometric structure useful in the teaching and application of functional mathematics.

In its broader aspects, this invention provides a plurality of mutually spaced-apart elements each having a respective mathematical function indictated thereon, and a plurality of members connected to and extending between predetermined ones of the elements. Each of the members has a respective interrelating equation indicated thereon and connects the elements which have the functions found in the equation respectively indicated thereon. When used for displaying trigonometric functions, the elements are three-dimensionally spaced-apart and have the respective trigonometric functions indicated thereon while the connecting members have the respective identity equations indicated thereon. In a specific embodiment of this invention, each of the elements may also have quadrant equations indicated thereon which include the function indicated on the respective element. Further, the quadrant equations relevant to each quadrant may be distinguished from the quadrant equations relevant to the other quadrants by a predetermined characteristic, such as position and/or color.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a side elevational view showing the preferred embodiment of the invention for displaying trigonometric functions;

FIG. 2 is a top view of the device of FIG. 1;

FIG. 3 is a view showing one end of the device shown in FIG. 1;

FIG. 4 is a view showing another end of the device of FIG. 1 from a direction diagrammatically opposite of the direction viewed in FIG. 3;

FIG. 5 is a fragmentary cross-sectional view showing a detail of the construction of the device of FIG. 1 taken along line 5—5 of FIG. 2;

FIG. 6 is a fragmentary cross-sectional view taken along line 6—6 of FIG. 2;

FIG. 7 is a view in perspective of the device of FIG. 1;

FIG. 8 is a top view of the base of the device of FIG. 1 showing the angles and quadrant relationships indicated thereon;

FIG. 9 is a cross-sectional view showing another detail of the construction of the device of FIG. 1 and taken along the lines 9—9 of FIGS. 1, 2 and 6;

FIG. 10 is a diagrammatic view showing the trigonometric functions and reduction equations indicated on the elements of the device of FIG. 1;

FIG. 12 is a cross-sectional view taken along the line 12—12 of FIG. 1 and showing the remaining co-function equations;

FIG. 13 shows the trigonometric definitions which may be indicated on the supporting post of the device of FIG. 1; and FIG. 14 is a fragmentary view in perspective showing the form of element for the device of FIG. 1 having the appropriate function definition molded therein and visible therethrough.

Figure 11:
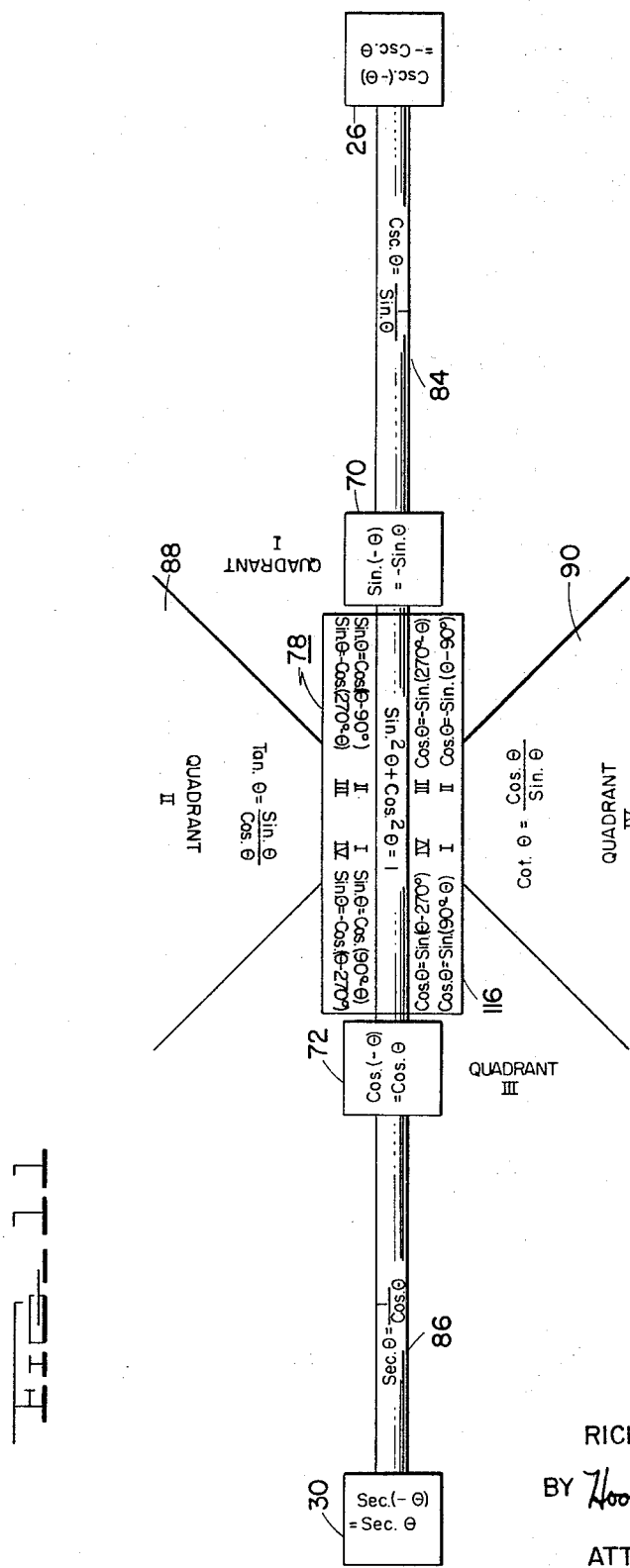
FIG. 11 is another diagrammatic illustration showing some of the identity equations and co-function equations indicated on the connecting members of the device of FIG. 1.

Referring now to the drawings, in which a preferred embodiment of the invention for visually displaying trigonometric functions and their interrelating equations is shown, the device of the invention takes the form of a three-dimensional geometric structure 20 mounted on a circular base member 22. The structure 20 comprises four cube-shaped elements 24, 26, 28 and 30. Elements 24, 26, 28, 30 are equally spaced about a circle which is in coaxial and spaced-apart relationship with the circular base member 22 and have their upper sides 32 lying in a plane parallel with and spaced from the upper surface 34 of base member 22. Elements 24, 28 form a first pair of diametrically opposite elements having their inner facing sides 36, 38 respectively parallel, and elements 26, 30 form a second pair of diametrically opposite elements having their inner facing sides 40, 42 respectively parallel.

A first elongated rod member 44 is respectively connected to and extends between the facing sides 36, 38 of the first pair of elements 24, 28. Another elongated rod member 46 is respectively connected to and extends between the facing sides 40, 42 of the second pair of elements 26, 30. As best seen in FIG. 6, rod member 46 is bent or bowed slightly so as to underlie rod member 44. Post member 48 supports rod member 46 and structure 20 on base member 22 and is coaxial therewith and with the circle about which elements 24, 26, 28, 30 are spaced.

An arcuate rod member 50 is respectively connected to and extends between sides 52, 54 of elements 26, 28 and another arcuate rod member 56 is respectively connected to and extends between sides 58, 60 of elements 24, 30. For purposes of symmetry and mechanical support, arcuate rod members 62, 64 are also provided respectively connecting elements 24, 26 and 28, 30, however these rod members are not used for displaying indicia as will hereinafter be described.

Referring briefly to FIG. 5, in a specific embodiment the arcuate rod members 50, 56, 62, 64 comprise tubular sleeves 66 on a circular supporting wire 68 which extends through openings in the respective elements 24, 26, 28, 30, as shown.

A third pair of cube-shaped elements 70, 72 are provided having their lower sides 74, 76 lying in a plane vertically spaced above and parallel with the upper surface 34 of base 22 and the sides 32 of the elements 24, 26, 28, 30. Elements 70, 72 are spaced-apart by a distance less than the spacing between elements 26, 30 and lie in a vertical plane including a line drawn between the centers of elements 26, 30 and the common axis of post 48 and circular base member 22, as best seen in FIG. 2. An elongated rod member 78 is respectively connected to and extends between the parallel facing sides 80, 82 of elements 70, 72. Elongated member 84 is respectively connected to and extends between upper side 32 of element 26 and lower side 74 of element 70 and another elongated rod member 86 is respectively connected to and extends between upper side 32 of element 30 and lower side 76 of element 72. It will be observed that rod members 78, 84, 86 are in vertical alignment with rod member 46 and the axes thereof lie in the afore-mentioned vertical plane. The rod members 84, 86 will also be observed to generally extend vertically upwardly and are inclined inwardly toward the axis of post 48 and circular base member 22.

A pair of generally triangular members 88, 90 are provided preferably formed of a relatively thin, self-supporting and transparent sheet of plastic material, such as methylmethacrylate. It will be observed that in a specific embodiment of this invention, the base sides 92 of the members 88, 90 are slightly curved or arcuate and that the corners 94, 96 and apex ends 98 are truncated. Triangular member 88 has its truncated ends 94, 96 respectively seated in slots 100 formed in the bottom sides 74, 76 of elements 70, 72 and has its apex end 98 seated in slot 102 formed in upper side 32 of element 24. Triangular member 88 is thus connected to and extends between the upper pair of elements 70, 72 and the element 24. Triangular member 90 has its truncated ends 94, 96 similarly seated in slots 100 in the bottom sides 74, 76 of the upper elements 70, 72 and its apex end 98 seated in slot 102 in the upper side 32 of element 28. Triangular member 90 thus connects and extends between the upper pair of elements 70, 72 and element 28.

Referring now to FIG. 9, the rod member 44 which connects elements 24, 28 is shown to comprise an inner rigid rod 104 and an outer transparent sleeve 106 mounted on and rotatable with respect to inner rod 104 for a purpose to be hereinafter more fully described. Similarly, rod member 46 which connects elements 26, 30 comprises an inner rigid rod 108 and two transparent sleeves 110, 112 respectively mounted on and rotatable with respect to the inner rod 108 and disposed on either side of post 48, as best seen in FIG. 6. The upper rod member 78 which connects elements 70, 72 also comprises an inner rigid rod 114 and an outer transparent sleeve 116 rotatably mounted thereon, again for a purpose to be hereinafter more fully described.

Referring now to FIG. 8, for the teaching and application of trigonometric functions, the upper surface 34 of base 22 is shown to have the four quadrants I, II, III and IV of a circle coaxial with the axis of post 48 indicated thereon with the angles in degrees of the respective four quadrants indicated thereon at the peripheral edge 118. Each quadrant may further be sub-divided by degrees and radius, as shown. Other indicia such as the angle $\theta$ and its generation by the radius $r$ which are useful in explaining and understanding trigonometric functions may also be indicated, as shown. It will be readily understood that the base member 22 need not be circular and that the "quadrant indicia" as mentioned in this paragraph may be indicated on the upper surface 34 as well as on the peripheral edge 118.

In the preferred embodiment of this invention, the geometric structure 20 is secured in a position with respect to the four quadrants indicated on the base 22 so that rod member 44 bisects quadrants II and IV and rod member 46 bisects quadrants I and III, as best seen in FIG. 2.

In a specific embodiment, the six trigonometric functions sine $\theta$, cosine $\theta$, tangent $\theta$, and cotangent $\theta$, for example, can be respectively indicated in a suitable manner as by printing, stamping, or a like manner, on the upper surface of the cube-shaped elements. More particularly, in the embodiment illustrated, the $(-\theta)$ equations $$\tan(-\theta) = -\tan\theta,$$
$$\cot(-\theta) = -\cot\theta,$$
$$\csc(-\theta) = -\csc\theta,$$
$$\sec(-\theta) = \sec\theta,$$

are respectively indicated on the upper surfaces 32 of elements 24, 26, 28 and 30 while $$\sin(-\theta) = -\sin\theta,$$
$$\cos(-\theta) = \cos\theta$$

are respectively indicated on the upper surfaces 120 of elements 70, 72, as best seen in FIG. 2.

Referring now additionally to FIGS. 11 and 12, the eight basic identity equations which interrelate the six basic trigonometric functions can be respectively indicated on the members which interconnect the elements. More particularly, in the embodiment illustrated, each of the members 44, 50, 56, 78, 84, 86, 88, 90 has the respective identity equation indicated thereon which includes the functions indicated on the elements between which the member is connected. In the case of the members 44, 78, the respective identity equation is indicated on the inner rod members 104, 114 for viewing through the respective transparent sleeves 106, 116.

For the purpose of teaching or applying the trigonometric functions, the device as thus far described is sufficient as the basic trigonometric functions are indicated on the respective elements and the basic identity equations are indicated on the respective interconnecting members. However, it is also desirable to include the indicia indicating the quadrant equations, i.e., the reduction equations and the co-function equations, and also to provide a means to differentiate the quadrant equations relevant to each quadrant from the quadrant equations relevant to the other quadrants. Referring now particularly to FIG. 10, each of the elements 24, 26, 28, 30, 70, 72 has indicated on its vertically extending sides (as opposed to its top and bottom sides) the reduction equations for the respective function. Furthermore, these reduction equations are positioned on the respective sides for viewing from the respective quadrant directions which are defined by lines drawn through the axis of post 48 at 45, 135, 225, and 315 degrees as indicated by the indicia on base 22. Thus, since there are no reduction equations for the first quadrant, it will be seen that the sides of the elements which face or are viewed from the first quadrant direction are blank, i.e., have no indicia thereon. However, it will be seen that the third quadrant reduction equations are respectively indicated on the side 58 of element 24, on the side 40 of element 26, on the side 122 of element 28, on the side 124 of element 30, on the side 80 of element 70, and on the side 126 of element 72. Each of these equations may be viewed from a direction of 225 degrees as indicated by the indicia on the base 22, and the arrow 128. It will be seen that the second and forth quadrant reduction equations are likewise located or positioned on the respective sides of the elements for viewing from the respective quadrant direction as afore-mentioned.

In addition to the above-described means for differentiating or distinguishing the reduction equations relevant to each quadrant from the reduction equations relevant to the other quadrants by position, the reduction equations for the respective quadrants may also be color-coded. Thus, equations applicable to the first quadrant only may be indicated in red, equations applicable to the second quadrant only may be indicated in green, equations applicable to the third quadrant only may be indiciated in violet, and equations applicable to the fourth quadrant only may be indicated in blue, with the basic function and identity equations applicable to all four quadrants being indicated in black.

Referring now particularly to FIGS. 11 and 12, the tangent and cotangent co-function equations for the four quadrants may be indicated on the transparent sleeve 106 which is rotatable about the inner rod 104, in a manner so as to place these co-function equations on either side of the underlying identity equation, as shown, so that both the identity equation and the co-function equations may be viewed at the same time. Similarly, the sine and cosine co-function equations are indicated on the transparent sleeve 116 surrounding the inner rod 114 of member 78 and disposed on either side of the respective identity equation so that both the co-function equations and the identity equation may be viewed at the same time. Finally, the secant and cosecant co-function equations are respectively indicated on the sleeve members 110, 112 rotatably mounted on the rod 108 of rod member 46 in a similar manner. Additionally, these co-function equations may be color-coded in the same manner as the reduction equations.

As an example of the utilization of the device described and illustrated above, it will be assumed that the student wishes to take the tangent of 215 degrees by employing the co-function equations and a book of trigonometric tables. The student will first observe the base member 22 and determine that 215 degrees falls between 210 degrees and 225 degrees and is thus in the third quadrant. The student will then observe the structure in the third quadrant direction, i.e., the direction of arrow 128 or from 225 degrees as indicated on base 22, so that the tangent element 24 is to the left and the cotangent element 28 is to the right. The student will then observe the co-function equation as indicated on the transparent sleeve 106 of the rod member 44, as seen in FIG. 12, and will then observe that the third quadrant co-function is $$\tan \theta = \cot (270-\theta)$$

He will then note that $$\tan \text{ of } 215 \text{ degrees} = \cot (270-215)$$

which equals cot 55 and from his book of trigonometric tables can determine that the $$\cot \text{ of } 55 = 0.7002$$

If on the other hand, the student had desired to obtain the tangent of 215 degrees by using the respective reduction equation, he would observe the third quadrant tangent equation $$\tan \theta = \tan (\theta - 180)$$

appearing on side 58 of element 24.

It is further helpful in the teaching and application of trigonometry to provide an indication of the basic function definitions and in the illustrated embodiment thereof. Such may be indicated on the post 48 as shown in FIG. 13.

It will be readily understood that the function-indicating elements may take forms other than the cubes shown in the previous figures and the above-description. Thus, as shown in FIG. 14, the elements may be formed as cylinders. In one embodiment of this invention, these cylinders may be molded of transparent plastic material and have the definition of the respective trigonometric function molded therein for viewing, as shown at 132. It will be readily seen that the function-indicating elements may also have other shapes, such as a sphere.

Mathematics has often been described as a tree, the axioms and postulates forming the roots; the definitions forming the trunk; and the theorems forming the limbs. It will be observed that this philosophical approach is embodied in the device of this invention since the angle placed in the standard position on the axis of an $xy$ coordinate system appears at the bottom (the roots), the definitions appear on post 48 (the trunk), and the functions and interrelating equations appear on the geometric structure 20 (the limbs).

It will be readily seen that the visual trigonometric instructional device described above may be employed as a base for a lamp in which case the angular quadrant indicia may either be presented on the base as illustrated or upon the shade. It will further be seen that the device itself may be embodied on a lamp shade with the basic functions and identities indicated thereon in the manner shown.

While there have been described above the principles of this invention in connection with specific apparatus, it is to be clearly understood that this description is made only by way of example and not as a limitation to the scope of this invention.

What is claimed is:

1. A device for visually displaying a plurality of interrelated mathematical functions and their interrelating equations comprising a plurality of mutually spaced-apart elements each having a respective one of said functions indicated thereon; and a plurality of members respectively connected to and extending between predetermined ones of said elements, each of said elements being connected to at least three other of said elements by said members, each of said members having a respective one of said equations indicated thereon and connecting the respective elements which have the functions included in said one equation indicated thereon.

2. A device for visually and three-dimensionally displaying a plurality of interrelated mathematical functions and their interrelating equations comprising a plurality of elements equal in number to said functions each having a respective one of said functions indicated thereon, said elements being three-dimensionally spaced-apart; and a plurality of members respectively connected to each of said elements, said members extending between said last-mentioned elements and predetermined ones of said elements, each of said members having a respective one of said equations indicated thereon and connecting the respective elements which have the functions included in said one equation indicated thereon.

3. The device of claim 2 wherein said functions are trigonometric functions and said equations are trigonometric identities.

4. The device of claim 2 wherein said functions are trigonometric functions and said equations are trigonometric identity equations and wherein each of said elements is formed of molded translucent material with indicia indicating the definition of the respective functions included therein.

5. A three-dimensional geometric structure comprising four elements having centers lying in a first plane and equally spaced about a circle to define first and second pairs of diametrically opposite elements; a first member respectively connected to and extending between said first pair of elements; a second member respectively connected to and extending between one of said first pair of elements and one of said second pair of elements; a third member respectively connected to and extending between the other of said first pair of elements and the other of said second pair of elements; a third pair of spaced-apart elements having centers spaced from said first plane and in a second plane including said centers of said second pair of elements and normal to said first plane; a fourth member respectively connected to and extending between said third pair of elements; a fifth member respectively connected to and extending between one of said third pair of elements and one of said second pair of elements; a sixth member respectively connected to and extending between the other of said third pair of elements and the other of said second pair of elements; a seventh member respectively connected to and extending between said third pair of elements and one of said first pair of elements; and an eighth member respectively connected to and extending between said third pair of elements and the other of said first pair of elements.

6. The structure of claim 5 wherein said third pair of elements are spaced-apart by a distance less than the spacing of said first and second pair of elements, wherein said seventh and eighth members are respectively flat and generally triangular, wherein the remaining members are elongated rods, and wherein said elements are cube-shaped.

7. The structure of claim 5 further comprising a base member spaced from and parallel with said first plane; a ninth member respectively connected to and extending between said second pair of elements; and means connecting said base member to one of said first and ninth members.

8. The structure of claim 5 wherein each of said elements has a different trigonometric function indicated thereon, and wherein each of said members has a different trigonometric identity equation indicated thereon which includes the respective functions which are indicated on the elements connected thereto.

9. The structure of claim 5 wherein said first pair of elements respectively have tangent and contangent trigonometric functions indicated thereon; wherein said second pair of elements respectively have secant and cosecant trigonometric functions indicated thereon; wherein said third pair of elements respectively have sine and cosine trigonometric functions indicated thereon; and wherein each of said members has a different trigonometric identity equation indicated thereon including the respective functions which are indicated on the elements connected thereto.

10. The structure of claim 9 further comprising another member connected to said elements and having the four quadrants of a circle coaxial with said first-named circle indicated thereon.

11. The structure of claim 9 wherein each of said elements has quadrant equations for the respective functions indicated thereon; all of the quadrant equations for each quadrant being disposed on the respective elements for viewing from the same direction.

12. The structure of claim 9 further comprising a ninth member respectively connected to and extending between said second pair of elements; wherein each of said elements has quadrant equations of one type for the respective function indicated thereon; wherein said first member has tangent and cotangent quadrant equations of the other type indicated thereon; wherein said third member has sine and cosine quadrant equations of the other type indicated thereon; and wherein said ninth member has secant and cosecant quadrant equations of the other type indicated thereon; one of said quadrant equation types being function reduction equations and the other being co-function equations.

13. A three-dimensional geometric structure comprising a base member; four cube elements having respective upper first sides lying in a first plane spaced from and parallel with said base member and having centers equally spaced about a circle to define first and second pairs of diametrically opposite elements having parallel facing second sides; a first elongated rod member respectively connected to and extending between said second sides of said first pair of elements; a second elongated arcuate rod member respectively connected to and extending between respective third sides of one of said first pair of elements and one of said second pair of elements; a third elongated arcuate rod member respectively connected to and extending between respective third sides of the other of said first pair of elements and the other of said second pair of elements; means for supporting said first and second pairs of elements on said base member; a third pair of spaced-apart cube elements having respective lower first sides lying in a second plane spaced from and parallel with said first plane and facing said first sides of said first and second pairs of elements, said third pair of elements having centers lying in a third plane including said centers of said second pair of elements and normal to said first and second planes, said third pair of elements being spaced-apart by a distance less than the spacing of said second pair of elements and having parallel facing second sides; a fourth elongated rod member respectively connected to and extending between said second sides of said third pair of elements; a fifth elongated rod member respectively connected to and extending between said first sides of one of said third pair of elements and a corresponding one of said second pair of elements; a sixth elongated rod member respectively connected to and extending between said first sides of the other of said third pair of elements and the other of said second pair of elements; a seventh generally triangular member having its base side connected to said first sides of said third pair of elements and extending therebetween and having its apex end connected to said first sides of one of said first pair of elements; and an eighth generally triangular member having its base side connected to said first sides of said third pair of elements and extending therebetween and having its apex end connected to said first side of the other of said first pair of elements.

14. The device of claim 13 further comprising a ninth elongated rod member respectively connected to and extending between said second sides of said second pair of elements; and wherein said supporting means comprises an upstanding post member having its lower end connected to said base member and its upper end connected to one of said first and ninth members.

15. The apparatus of claim 13 further comprising a sleeve formed of transparent material surrounding said fourth rod member and rotatable thereon; another sleeve member formed of transparent material surrounding said first rod member and rotatable thereon; and at least one sleeve formed of transparent material surrounding said ninth rod member and rotatable thereon.

16. The apparatus of claim 13 wherein said first pair of elements respectively have tangent and cotangent trigonometric functions indicated on their upper sides; wherein said third pair of elements respectively have sine and cosine trigonometric functions indicated on their upper sides; and wherein each of said members has a different trigonometric identity equation indicated thereon including the respective functions which are indicated on the elements connected thereto.

17. The structure of claim 16 wherein said base member has the four quadrants of a circle coaxial with said first named circle indicated thereon; and wherein each of said elements has a quadrant equation for the respective function indicated on respective sides thereof, all of the quadrant equations for each quadrant being disposed on respective sides of the respective elements for viewing in the radial direction of the respective quadrant.

18. The structure of claim 16 further comprising a ninth elongated rod member respectively connected to and extending between said second sides of said second pair of elements, and transparent sleeves respectively rotatably mounted on said first, third and ninth rod members whereby the respective identity equations may be viewed therethrough; wherein said base member has the four quadrants of a circle coaxial with said first-named circle indicated thereon; wherein each of said elements has a quadrant equation of one type for the respective functions indicated on respective sides thereof, all of said quadrant equations for each quadrant being disposed on respective sides of the respective elements for viewing in the radial direction of the respective quadrant; and wherein each of said sleeve members has quadrant equations of the other type for the functions of the elements connected to the respective rod member indicated thereon; one of said quadrant equation types being function reduction equations and the other being co-function equations.

19. A device for visually and three-dimensionally displaying trigonometric functions and their interrelating equations comprising a plurality of elements each having a respective function indicated thereon, said elements being three-dimensionally spaced-apart; and a plurality of members extending between predetermined ones of said elements, each of said members having a respective identity equation indicated thereon and connecting the respective elements which have the functions included in the respective equation indicated thereon, each of said elements being connected to at least three other of said elements by said members; each of said elements further having quadrant equations indicated thereon which include the function indicated on the respective elements.

20. The device of claim 19 wherein the quadrant equations relevant to each quadrant are distinguished from the quadrant equations relevant to the other quadrants by a predetermined characteristic.

References Cited by the Examiner

UNITED STATES PATENTS

| 1,810,421 | 6/1931 | Guyer | 35—34 |
| 2,509,301 | 5/1950 | Henry | 35—34 |
| 2,521,930 | 9/1950 | McPortlin | 35—30 |
| 2,879,066 | 3/1959 | Sutherland | 35—31 X |

EUGENE R. CAPOZIO, *Primary Examiner.*

W. GRIEB, *Assistant Examiner.*

UNITED STATES PATENT OFFICE
CERTIFICATE OF CORRECTION

Patent No. 3,314,170                                April 18, 1967

Richard L. Beam

It is hereby certified that error appears in the above numbered patent requiring correction and that the said Letters Patent should read as corrected below.

Column 4, line 7, after "$\theta$," insert -- and --; column 6, line 40, for "translucent" read -- tralucent --; column 7, line 11, for "contangent" read -- cotangent --.

Signed and sealed this 14th day of January 1969.

(SEAL)
Attest:

Edward M. Fletcher, Jr.                             EDWARD J. BRENNER
Attesting Officer                                      Commissioner of Patents